United States Patent

Gropp et al.

[11] Patent Number: 6,116,287
[45] Date of Patent: Sep. 12, 2000

[54] FLEXIBLE TUBE ELEMENT FOR EXHAUST SYSTEMS

[75] Inventors: Reinhard Gropp, Neuenbürg-Arnbach; Jörg Hornung, Ubstadt-Weiher; Michael Pluschke, Neuenbürg-Rotenbach, all of Germany

[73] Assignee: Witzenmann GmbH Metallschlauch-Fabrik Pforzheim, Pforzheim, Germany

[21] Appl. No.: 09/015,514

[22] Filed: Jan. 29, 1998

[30] Foreign Application Priority Data

Jan. 31, 1997 [DE] Germany .................. 297 01 625 U

[51] Int. Cl.⁷ ........................................... F16L 11/16
[52] U.S. Cl. ..................... 138/114; 138/121; 138/123; 138/135
[58] Field of Search ................... 138/112, 118, 138/114, 121, 123, 134, 135, 109; 92/35, 37; 181/227, 249; 165/154

[56] References Cited

U.S. PATENT DOCUMENTS

| | | | |
|---|---|---|---|
| 816,596 | 3/1906 | Perzoff | 138/135 |
| 1,340,818 | 5/1920 | Brinkman | 138/135 |
| 1,809,874 | 6/1931 | Stone | 138/135 |
| 2,056,840 | 10/1936 | Collom | 138/135 |
| 3,773,087 | 11/1973 | Katayama | 138/120 |
| 3,934,618 | 1/1976 | Henderson | 138/114 |
| 4,315,558 | 2/1982 | Katayama | 138/120 |
| 4,415,185 | 11/1983 | Vinciguerra et al. | 138/121 |
| 5,660,419 | 8/1997 | Kim | 138/109 |
| 5,813,438 | 9/1998 | Reed | 138/109 |

FOREIGN PATENT DOCUMENTS

| | | |
|---|---|---|
| 0 448 769 | 10/1991 | European Pat. Off. . |
| 42 02 808 | 8/1983 | Germany . |
| 37 02 243 | 8/1988 | Germany . |

*Primary Examiner*—James F. Hook
*Attorney, Agent, or Firm*—Venable; Gabor J. Kelemen

[57] ABSTRACT

A flexible tube element for an exhaust pipe of a vehicle engine includes a first end and an opposite, second end; a circumferentially corrugated metal bellows extending between the first and second ends; a first stripwound metal hose arranged coaxially with the bellows between the first and second ends; a second stripwound metal hose arranged coaxially with the bellows and the first stripwound metal hose between the first and second ends; and first and second generally cylindrical connection fittings arranged at the first and second ends, respectively, and being coaxial with the bellows.

12 Claims, 4 Drawing Sheets

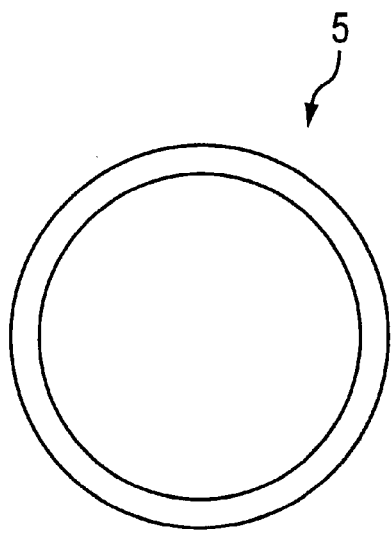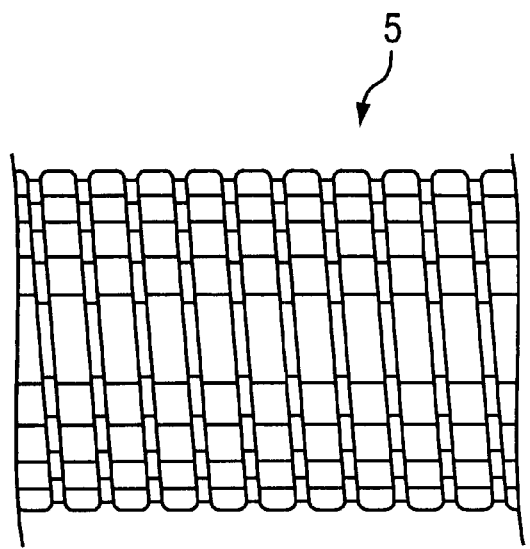
FIG. 7A
FIG. 7B

FLEXIBLE TUBE ELEMENT FOR EXHAUST SYSTEMS

BACKGROUND OF THE INVENTION

This invention was made for the purpose of constructing a flexible tube element for the exhaust systems of combustion engines in vehicles with a helically or annularly corrugated bellows made of metal, with a stripwound metal hose in a coaxial position to the bellows and with coaxial, mostly cylindrical connection fittings installed at the ends of the bellows and/or the hose.

Such flexible tube elements are, as a rule, installed as an intermediate part in an automotive exhaust system which consists of rigid elements, for the purpose of absorbing such movements and vibrations as are caused by the elastically supported engine, by shock, by changes of length due to thermal effects, etc., and of insulating adjacent components from such movements and vibrations. The tube elements therefore not only have to have sufficient heat-insulating and sound absorbing properties and have to be tight to exhaust gases, they especially have to have suitable vibration damping properties.

Whereas the bellows, together with the connection fittings which are at least indirectly fixed to the bellows usually by welding, provides gas-tightness of the metal hose element, the stripwound metal hose is the part on which the damping properties are based. The damping of movements by this helically stripwound metal hose made of an, in general, pre-profilated metal strip by interlocking adjacent strip edges and by forming several layers with interlocked profile, is achieved by the conversion of the movements into friction, the so-called lost work of deformation, between the adjacent strip edges or layers with interlocked profile, for an angular, axial, lateral or torsional deflection. The friction values depend on the rate of winding or interlocking.

For an optimum damping of movements, the winding rate must be defined thus that there is neither almost no friction between the said hose edges due to a too loose winding which will reduce the obtainable damping properties to a very low value, nor that the winding is so tight that the friction in the metal hose is too high due to its rigidity, with the damping properties of the metal hose being reduced to a rate almost equal to the very low damping properties of a rigid pipe.

Even if a stripwound metal hose of optimum design is installed in the flexible tube element, there are still applications in which the damping properties of the metal hose cannot take full effect or in which its damping properties are yet not sufficient. The damping properties can be diminished at certain operating temperatures of the stripwound metal hose, i.e. at high temperatures of the hose due to a longer operating period of the exhaust system. One reason for this effect is the so-called thermal stiffening occurring especially in the bending zones of the stripwound hose due to the different material tensions induced during the winding process trying to relax and expanding at different rates in this process. As a result, there is an increase in friction between the adjacent strip edges or layers with interlocked profile, which will cause a restriction of the mobility of the hose or an increase in wear of the hose areas which are in contact with each other and, finally, a deterioration of the damping properties.

SUMMARY OF THE INVENTION

On the basis of the foregoing facts, this invention was made for the purpose of providing a flexible tube element of the kind mentioned in the beginning, whose advantages are an improvement of the damping properties and their persistence for a longer operating period regardless of the application and installation conditions.

In respect to the flexible metal hose element described hereinbefore, these requirements are met by providing a second stripwound metal hose in a coaxial position to the first stripwound metal hose already mentioned. The advantage of this design is the distribution of the respective requirements to two metal hoses, thus guaranteeing that, in any case, both metal hoses will achieve a maximum lost work of deformation for the purpose of optimum damping, and the reduction of thermal energy as only one example for the possible additional functions of the interior metal hose which works like an insulating device, protecting the first metal hose and the bellows from the heat of the exhaust gases.

This application allows the use of a stripwound hose with a loose winding for the reduction of temperatures, since the lost work of deformation it has to provide is only a secondary effect. The flexibility of this hose will avoid negative influences on the damping behavior of the first metal hose which will be subject to higher stress, requiring a tighter winding. This means that, due to the distribution of functions between the two hoses, made possible by the second stripwound metal hose, the first hose, whose task is damping, can always be designed with preference to optimum damping properties, whereas the second hose has to cover only a low lost work of deformation but has to carry out the task of protecting the first metal hose from conditions which may deteriorate its damping properties.

This combination of two metal hoses allows a high positioning variety, with the only precondition being at least an indirect firm connection of the two stripwound metal hoses with the connection fittings, since there is no other way of guaranteeing the desired damping between access and exit of the flexible tube element. According to this design, both metal hoses extend over at least a high percentage of the length of the metal hose element. It would also be possible to fix only the metal hose to the two connection fittings whose task is the damping of movements, whereas the second metal hose would still be able to provide insulation without a direct connection with the connection fittings, but the additional damping facility provided by this second hose would then not exist.

The two stripwound metal hoses can, e.g., be installed by insertion of one hose into the other under direct contact between them, or at a distance to each other due to the insertion of one spacer element. This design still allows both alternatives of installing both hoses either inside or outside the metal bellows. Furthermore, the bellows can also be placed between the two stripwound hoses.

The insulating effect of the interior metal hose allows the application of appropriate materials for the additional metal hose as well as for the bellows with regard to corrosion resistance, etc., which would alone be inappropriate for a temperature range existing under the influence of exhaust gases. The resistance of the metal hoses to thermal stiffening can be increased by the application of ferritic steel, whose expansion coefficient is only half the coefficient of austenitic steel.

In order to achieve an utmost damping of movements, it is recommended to select at least one hose with engaged profile for installation. A favorable feature of this hose type is the extension of the contact surfaces between adjacent strip layers providing an increase in friction or lost work of deformation.

In respect to the shape of the cross-sectional areas of the metal hoses, it is possible to use hoses with either polygonal or round cross-sectional areas. Regardless of these shapes, it is recommendable to select a diameter as high as possible for these metal hoses, i.e. to install them on the exterior surface of the bellows whenever possible, in order to provide a higher lost work of deformation rate by an increase in circumference and in the size of the contact surfaces of adjacent strip edges/layers with interlocked profile.

Finally, the equipment of the flexible tube element with a braiding hose consisting of metal wires, which is applied particularly if the two metal hoses are installed on the interior surface of the bellows and the bellows corrugations can be protected by this braiding hose from, e.g., influences from the environment, allows a high number of further modifications in respect to the positioning of the individual components in the metal hose element.

The foregoing series of examples makes it easy to get an idea of the possibilities and methods of designing the tube element by selection of the appropriate metal hose positions, winding rates etc., always allowing an optimum and long-lasting damping of movements. The only precondition to be complied with is the installation of the metal hose whose task is the damping of movements outside the critical temperature zone which would cause the thermal stiffening effects already mentioned, with the other metal hose providing the insulation of this metal hose and the bellows from these critical temperatures, and also being able to participate in the damping of movements.

BRIEF DESCRIPTION OF THE DRAWINGS

Further features and advantages of this invention are given in the following descriptions of design examples according to the drawings.

FIG. 7 shows a further alternative for the tube element, presented in a cross-sectional and in a lateral view.

DESCRIPTION OF THE PREFERRED EMBODIMENTS

Figure 1:
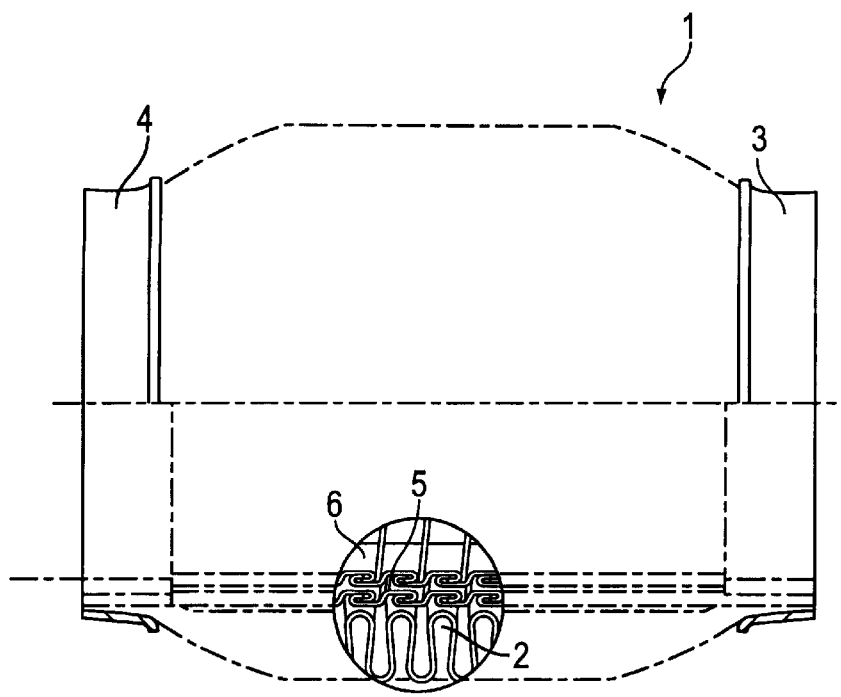
FIGS. 1 to 6 show design alternatives for a flexible tube element based on this invention, for installation in exhaust system, being presented in a lateral view, partly with axial section.

FIG. 1 shows a flexible tube element 1 which consists of a helically or annularly corrugated metal bellows 2, whose axial ends are equipped with cylindrical connection fittings 3, 4, thus forming a gas-tight connection. The tube element 1 also includes helically stripwound metal hoses 5, 6 of engaged profile, in coaxial positions to the bellows. These hoses extend between the two connection fittings 3 and 4 at a low distance to each other and are fixed there, with the bellows 2 being installed between them as an intermediate part. Whereas the bellows has the task of guaranteeing the gas tightness of the tube element, at least one of the two stripwound hoses with interlocked profile 5, 6 provides the required damping characteristics of the flexible tube element.

Presuming that the interior hose with interlocked profile is installed in the critical temperature zone, it is the task of this hose to insulate the hose with interlocked profile 5 and the bellows 2 from this critical temperature. As a consequence, the hose with interlocked profile 5 is designed and applied in a way which provides the highest percentage of the damping rate.

Figure 2:
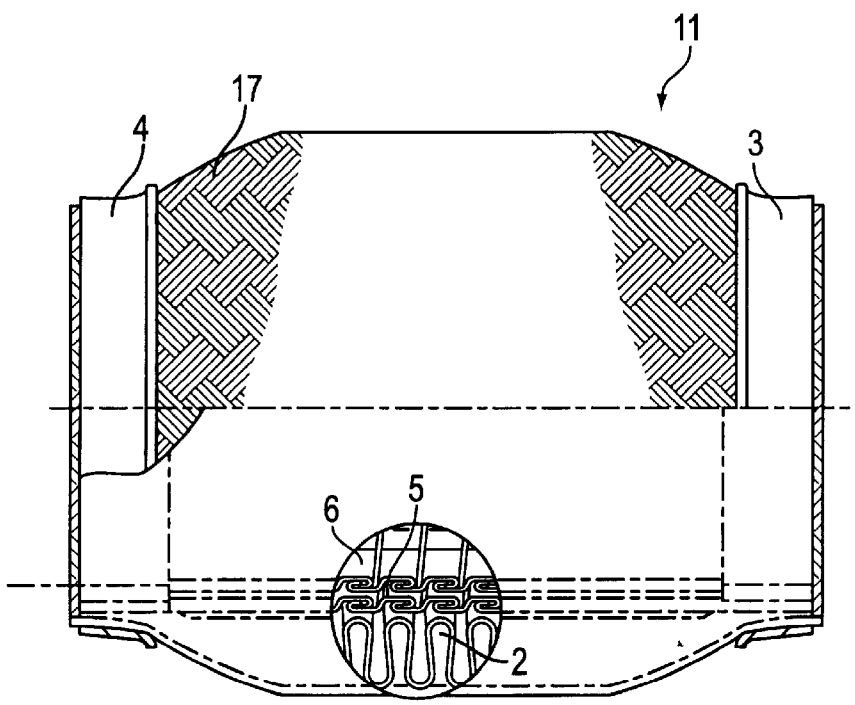

FIG. 2 presents a tube element 11 which, in addition to the components of the element shown in FIG. 1 (with identical components being marked with identical references), is equipped with a braiding hose 17 which consists of metal wire and is installed on the exterior surface of the bellows, protecting the bellows from influences of the environment.

In any other respect, the tube elements 1 and 11 are equal.

Figure 3:
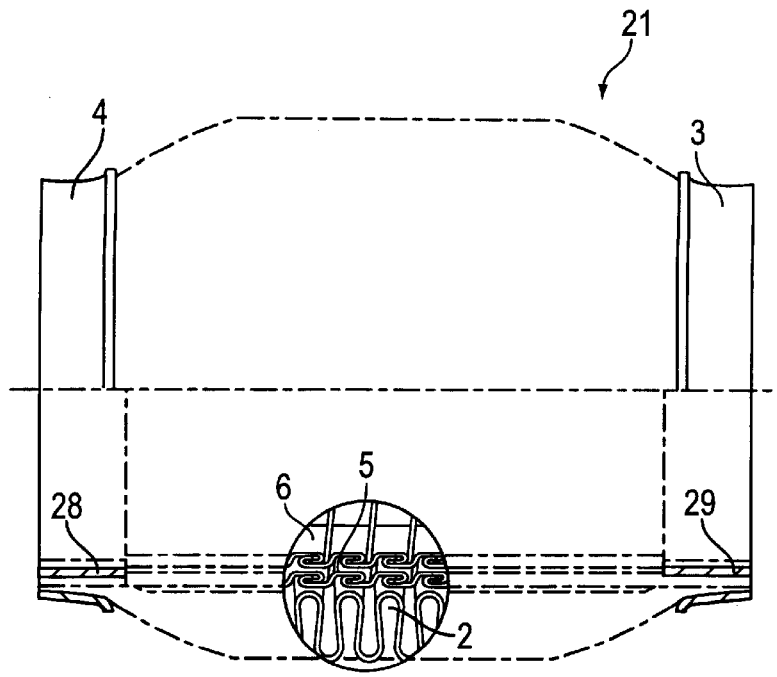

FIG. 3 shows a flexible tube element 21, consisting of the components of metal hose element 1, with the only additional feature being the installation of the hoses with interlocked profile 5 and 6, one of which is inserted into the other, at a distance to each other. This distance is achieved by spacer rings 28, 29, which are installed at the axial ends of the hoses in the zones of their connection fittings. These spacer rings avoid direct contact between the hoses for low angular movements, which excludes, e.g., the production of noise due to such contact. In any other respect, the tube elements 21 and 1 have equal designs and functions.

Figure 4:
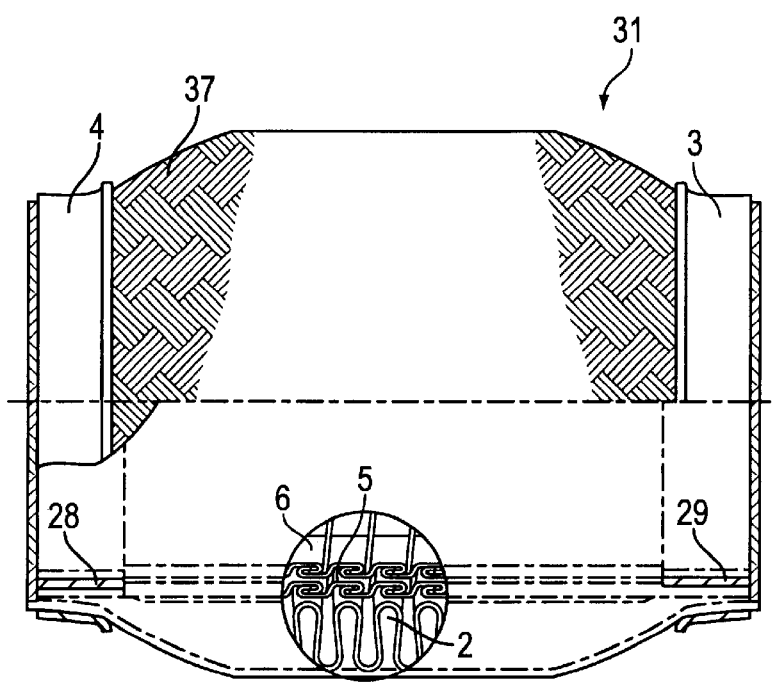

The difference between the tube element presented in FIG. 4 differs and the metal hose element shown in FIG. 3 is the equipment of the metal bellows 2 with a braiding hose 37 of metal wires on its exterior surface, similar to the braiding hose 17 installed in the tube element shown in FIG. 2.

Figure 5:
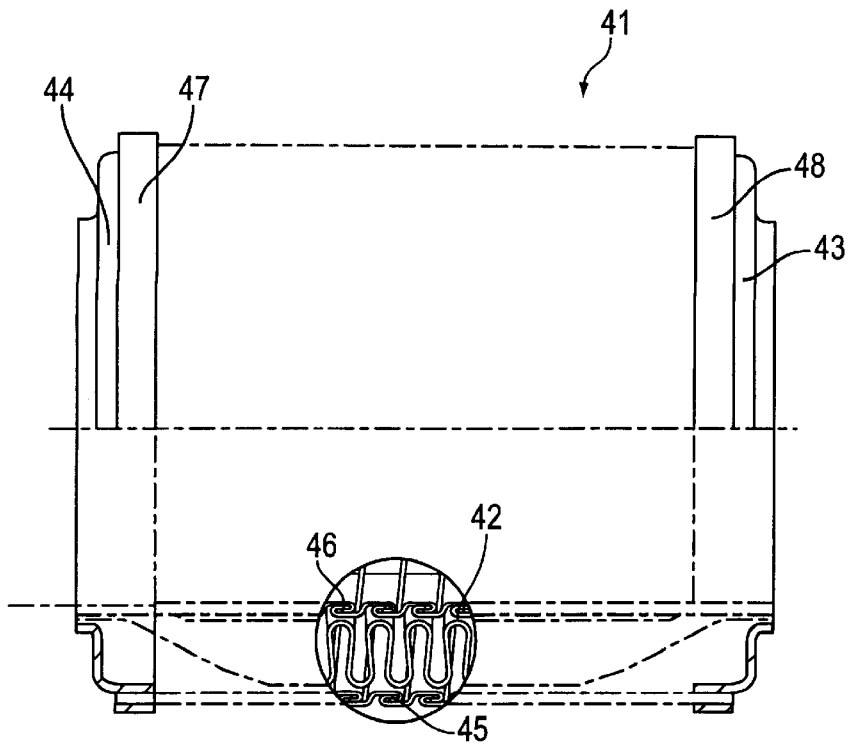

FIG. 5 shows a tube element 41 which differs to a higher extent from the tube elements presented in FIGS. 1 to 4. The metal hose element 41 consists of a metal bellows 42 whose ends are equipped with connection fittings 43, 44 and is equipped with a stripwound metal hose 46 with interlocked profile which is installed in the interior of this element and is fixed to the metal bellows in the zones of the connection fittings. The second metal hose 45 is equipped with two end sleeves 47, 48, each of them being provided for establishing a firm connection of one of the exterior ends of the hose with the corresponding connection fitting.

The metal bellows 42 is installed at a distance to both the first stripwound metal hose 46 and the second stripwound metal hose 45, thus avoiding a direct contact between the individual components under low angular movements between the two tube elements which would cause undesirable frictions and sounds.

In respect to the metal hose 45 installed on the exterior surface of the bellows it has to be mentioned that its diameter is, of course, larger than the diameter of metal hose 46, thus guaranteeing better damping properties due to the increase in the contact surface size of adjacent strip edges or layers with interlocked profile.

In the tube element 41, the two stripwound hoses are installed at a certain distance approximately equal to the height of the bellows corrugations, thus excluding a common connection in the zone of the connection fittings due to the cylindrical design of the stripwound hoses. The connection fittings 43, 44 are therefore bent at an angle which adapts them approximately to the exterior diameter of the interior stripwound hose 45 in the zone of their lower diameter, which provides a connection type between connection elements and stripwound hoses guaranteeing the transfer of movements.

Figure 6:
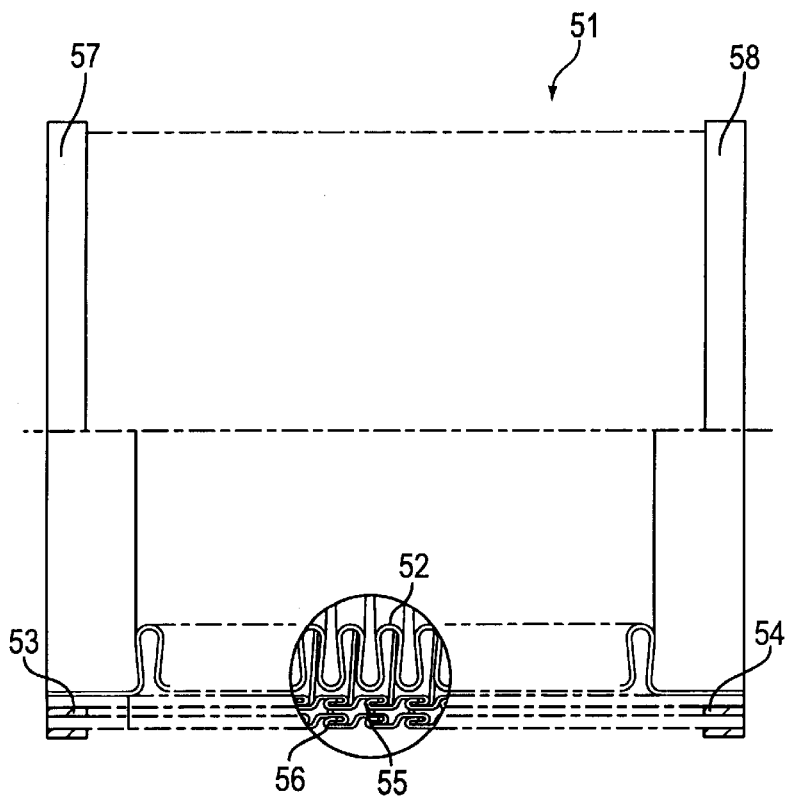

FIG. 6 shows a tube element 51 making use of the higher damping effect due to a larger diameter of the stripwound hoses on the principle of an arrangement of both stripwound hoses 55, 56 on the exterior surface of a bellows 52. Due to this design, the interior surface of the bellows 52 is directly subject to the influence of the exhaust gases and their temperatures. This fact restricts the application of this design to such engines or to such positions in the exhaust system in which the exhaust gas temperatures are uncritical for the function of the metal bellows 52.

Whereas in the tube elements shown in FIGS. 1 to 5, the connection fittings are connected with the bellows ends at the level of their interior diameters, the metal bellows 52 in FIG. 6 is connected with the end of the stripwound hose 55 in the diametrical zone of its corrugation crests. The connection fittings 53, 54 are located on the exterior surface of the stripwound hose 55, so that, in this version, there is only an indirect connection between bellows and connection fittings, with the stripwound hose 55 being installed as an intermediate part.

The second stripwound hose 56 is fixed to the exterior surfaces of the connection fittings 53, 54 which are, in this version, used as spacer elements similar to those shown in FIGS. 3, 4. This hose runs in a coaxial position to the first stripwound hose, with a distance between the two hoses due to these connection fittings. The exterior surface of the stripwound hose 56 is also equipped with two end sleeves which are used in welding the outward stripwound hose to the connection fittings, similar to the application of the end sleeves 47, 48 in FIG. 5.

To summarize, this invention provides the advantage of a distribution of functions made possible by the second metal hose which is installed in addition to the first stripwound metal hose. This distribution of function guarantees the persistent ability of insulating one metal hose and/or the bellows from critical exhaust gas temperatures by means of the other metal hose, thus allowing the selection of a metal hose version with optimum damping properties.

FIG. 7 shows a tube element 5 which has a polygonal cross-sectional outline.

What is claimed is:

1. A flexible tube element for an exhaust pipe of a vehicle engine, comprising
   (a) a gas-tight first end and an opposite, second end;
   (b) a circumferentially corrugated metal bellows extending between said first and second ends;
   (c) a first stripwound metal hose arranged coaxially with said bellows between said first and second ends;
   (d) a second stripwound metal hose arranged coaxially with said bellows and said first stripwound metal hose between said first and second ends; and
   (d) first and second generally cylindrical connection fittings arranged at said first and second ends, respectively, and being coaxial with said bellows.

2. The flexible tube element as defined in claim 1, wherein said first and second stripwound metal hoses are attached at least indirectly to said first and second connection fittings.

3. The flexible tube element as defined in claim 1, further comprising first and second spacer elements disposed between said first and second stripwound metal hoses at said first and second ends, respectively.

4. The flexible tube element as defined in claim 1, wherein said bellows is positioned between said first and second stripwound metal hoses.

5. The flexible tube element as defined in claim 1, wherein said first and second stripwound metal hoses are situated inwardly of said bellows.

6. The flexible tube element as defined in claim 1, wherein said first and second stripwound metal hoses are situated externally of said bellows.

7. The flexible tube element as defined in claim 1, wherein at least one of said first and second stripwound metal hoses is made of ferritic steel.

8. The flexible tube element as defined in claim 1, wherein at least one of said first and second stripwound metal hoses is a hose of interlocked profile.

9. The flexible tube element as defined in claim 1, wherein said first stripwound metal hose is wound differently tight from said second stripwound metal hose.

10. The flexible tube element as defined in claim 1, wherein at least one of said first and second stripwound metal hoses has a polygonal cross section.

11. The flexible tube element as defined in claim 1, wherein at least one of said first and second stripwound metal hoses has a circular cross section.

12. The flexible tube element as defined in claim 1, further comprising a braided metal hose coaxially surrounding said bellows and said first and second stripwound metal hoses.

* * * * *